W. C. DEVEREAUX
DOOR HANDLE.
APPLICATION FILED MAR. 1, 1920.
1,367,539. Patented Feb. 8, 1921.
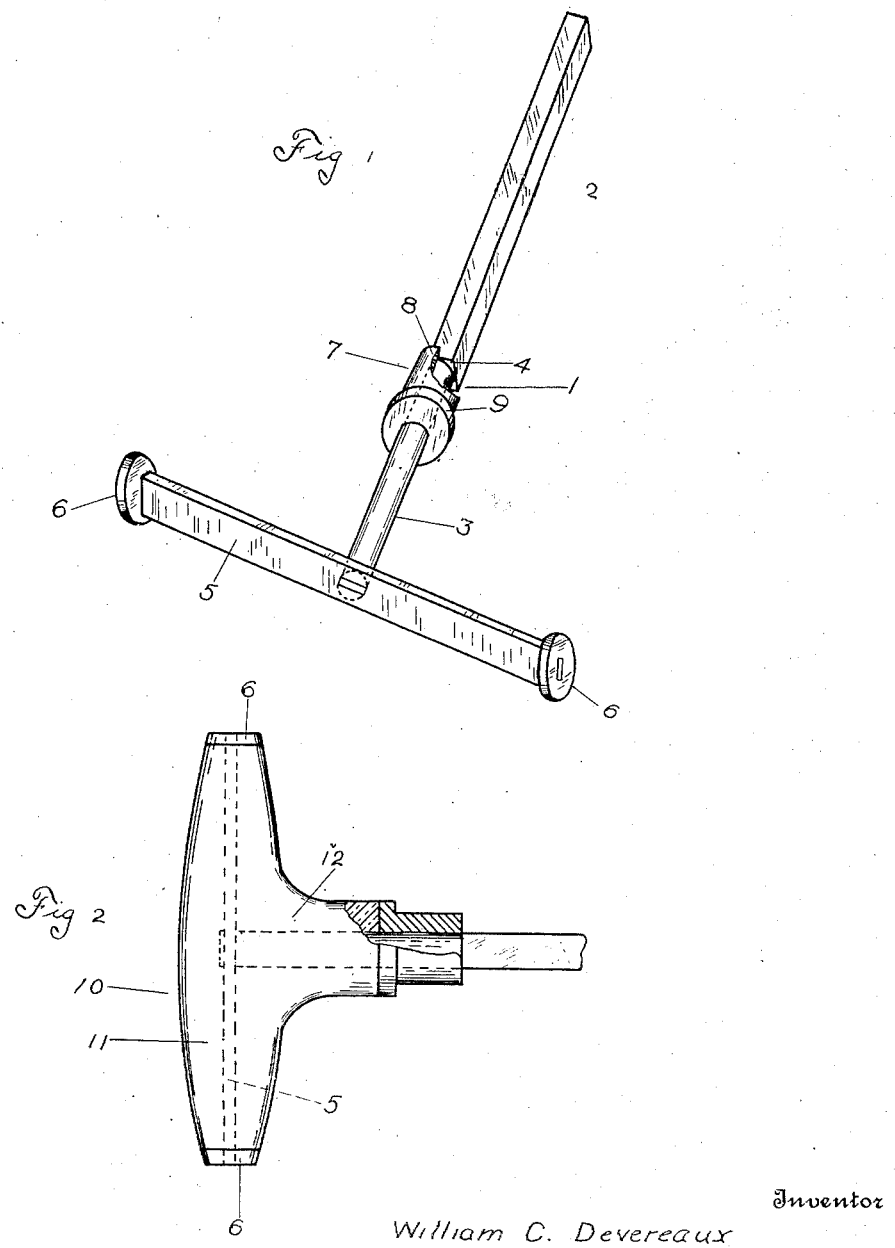
Inventor
William C. Devereaux
By Whittemore, Hulbert & Whittemore
Attorneys

UNITED STATES PATENT OFFICE.

WILLIAM C. DEVEREAUX, OF DETROIT, MICHIGAN.

DOOR-HANDLE.

1,367,539.   Specification of Letters Patent.   Patented Feb. 8, 1921.

Application filed March 1, 1920. Serial No. 362,182.

*To all whom it may concern:*

Be it known that I, WILLIAM C. DEVEREAUX, a citizen of the United States of America, residing at Detroit, in the county of Wayne and State of Michigan, have invented certain new and useful Improvements in Door-Handles, of which the following is a specification, reference being had therein to the accompanying drawings.

The invention relates to door handles and is especially applicable to automobile door handles.

Heretofore it has been usual to form handles for this class of work by casting or forging a grip member formed of a suitable alloy and having a grip portion which is recessed between its ends, and a stem which surrounds the outer end of the shank. The recessed part of the grip portion and also the stem is covered with vulcanized rubber, bakelite or condensite. There are several objections to this handle, as follows: A rigid connection between the shank and stem is not assured, due to the fact that during the casting operation the outer end of the shank is liable to sweat, thereby preventing cohesion of the cast metal with the shank; rotation of the grip member may cause splitting of the stem by the shank; and it is difficult, and at times impossible, to secure a meeting edge between the ends of the grip portion and vulcanized rubber which is in one plane.

These objectionable features are overcome by my invention. Furthermore, the cost of manufacture is greatly reduced. The invention has for other objects the novel arrangements of parts as more fully hereinafter set forth.

In the drawings:

Figure 1 is a perspective view of a door handle embodying my invention, with the covering removed.

Fig. 2 is a plan view partly in section.

1 is the shank which is adapted to actuate the latch mechanism (not shown). This shank comprises the polygonal portion 2 and the cylindrical portion 3 there being shoulders 4 in the plane of the meeting edges of these portions. 5 is a cross bar rigidly secured to the outer end of the cylindrical portion 3, as by riveting. 6 are end pieces rigidly secured to the opposite ends of the cross bar 5 as by riveting, these pieces being preferably formed of stampings and having a suitable contour, such as that of an ellipse. 7 is a collar sleeved upon the cylindrical portion 3 of the shank and having a cylindrical bearing portion 8 adapted for engagement with the door and an annular flange 9 at the outer end of this bearing portion.

10 is a grip member formed of vulcanized rubber and having the grip portion 11 surrounding the cross bar 5 and abutting the end pieces 6, the peripheral surface of each end of this grip portion registering with the peripheral surface of each end piece 6. The grip member also has the integral stem 12 surrounding the cylindrical portion 3 of the shank and abutting the collar 7, the peripheral surface at the end of this stem registering with that of the annular flange 9.

The shank 1 and cross bar 5 are preferably formed of cold rolled steel, while the end pieces 6 are preferably stamped from an alloy, such as brass.

It will be readily seen that this construction of handle is rigid throughout, and furthermore, is strong. Also the meeting edges of the ends of the grip portion 11 with the inner faces of the end pieces 6, as well as the meeting edge of the stem 12 with the annular flange 9, will each be in a plane, thereby presenting a neat and pleasing appearance.

What I claim as my invention is:

1. In a door handle, the combination with a shank, of a cross bar rigidly secured to an end of said shank, a collar sleeved upon said shank and having a bearing portion for engagement with a door, end pieces rigidly secured to the ends of said cross bar, and a grip member having a grip portion surrounding said cross bar and abutting said end pieces and a stem surrounding said shank and abutting said collar.

2. In a door handle, the combination with a shank having a polygonal portion and a cylindrical portion, of a cross bar rigidly secured to said cylindrical portion, and a collar sleeved upon said cylindrical portion and abutting said polygonal portion.

3. In a door handle, the combination with a shank having a polygonal portion and a cylindrical portion with shoulders on said polygonal portion in the plane of the meeting edges of both of said portions, of a cross bar rigidly secured to the end of said cylindrical portion, a collar sleeved upon said cylindrical portion and abutting the shoulders on said polygonal portion, said collar having a cylindrical bearing portion for engagement with a door, and an integral grip member having a grip portion surrounding said cross bar and a stem surrounding said cylindrical portion and abutting said collar.

4. In a door handle, the combination with a shank having a polygonal portion and a cylindrical portion with shoulders on said polygonal portion in the plane of the meeting edges of both of said portions, of a cross bar rigidly secured to the end of said cylindrical portion, stampings rigidly secured to the opposite ends of said cross bar, a collar sleeved upon said cylindrical portion and abutting the shoulders on said polygonal portion, and a T-shaped grip member having a grip portion surrounding said cross bar and abutting said stampings and a stem surrounding said cylindrical portion and abutting said collar.

In testimony whereof I affix my signature.

WILLIAM C. DEVEREAUX.